Figure 1:
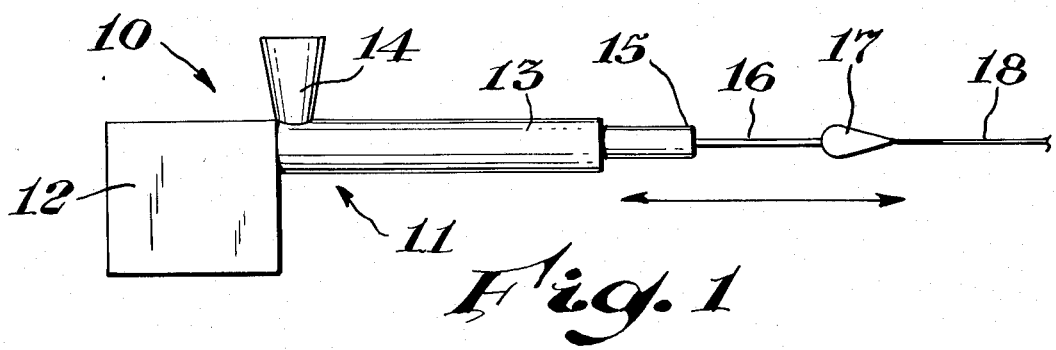

United States Patent [19]

Cohen

[11] Patent Number: 4,623,502
[45] Date of Patent: Nov. 18, 1986

[54] METHOD AND APPARATUS FOR THE EXTRUSION OF SYNTHETIC RESINOUS THERMOPLASTICS

[75] Inventor: Arie Cohen, Midland, Mich.

[73] Assignee: The Dow Chemical Company, Midland, Mich.

[21] Appl. No.: 712,044

[22] Filed: Mar. 15, 1985

[51] Int. Cl.$^4$ .............................................. B29C 47/16
[52] U.S. Cl. .............................. 264/176.1; 264/40.7; 264/216; 425/145; 425/224; 425/381; 425/466
[58] Field of Search ................. 264/176 R, 216, 40.7; 425/381, 466, 224, 113, 145

[56] References Cited

U.S. PATENT DOCUMENTS

| | | | |
|---|---|---|---|
| 2,284,520 | 5/1942 | Hassett | 264/216 |
| 2,991,508 | 7/1961 | Fields et al. | 264/176 R |
| 3,032,822 | 5/1962 | Maddock | 264/176 R |
| 3,245,115 | 4/1966 | Ecklund | 425/378 R |
| 3,382,535 | 5/1968 | Ferrari | 425/461 |
| 3,450,510 | 6/1969 | Calow | 264/108 |
| 3,487,504 | 1/1970 | Shanok et al. | 425/113 |
| 3,990,829 | 11/1976 | Frank et al. | 425/376 R |
| 4,390,581 | 6/1983 | Cogswell et al. | 264/515 |
| 4,485,062 | 11/1984 | Dawes et al. | 425/97 |
| 4,552,712 | 11/1985 | Ramamurthy | 264/564 |

Primary Examiner—Jeffery Thurlow
Attorney, Agent, or Firm—L. E. Hessenaur, Jr.

[57] ABSTRACT

In an extrusion process a feed conduit for the die is positioned axially in the extruder barrel to provide minimal surface roughness on the extrudate. Increased extrusion rates of quality product are obtained.

2 Claims, 3 Drawing Figures

U.S. Patent  Nov. 18, 1986  4,623,502

METHOD AND APPARATUS FOR THE EXTRUSION OF SYNTHETIC RESINOUS THERMOPLASTICS

Most thermoplastic materials employed in extrusion processes generally exhibit, for any particular extrusion condition, a maximum rate at which a smooth surfaced product may be obtained. When the maximum rate for a smooth surfaced product is exceeded, the surface of the extruded article generally becomes rough. As the extrusion rate is further increased, the roughness also increases. This phenomena is generally considered to be caused by melt fracture at the higher extrusion rates. Melt fracture is discussed in U.S. Pat. No. 2,991,508, issued July 11, 1961. U.S. Pat. No. 4,485,062 discloses process and apparatus for the extrusion of synthetic resinous thermoplastic polymers wherein higher extrusion rates are obtained under conditions which would normally lead to undue roughness or melt fracture of the extrude by encapsulating the material being extruded in a liquid of substantially lower viscosity. Such an apparatus requires in addition to a conventional extruding apparatus a pump, a low viscosity liquid reservoir, a porous material surrounding and/or lining the extruding passage, the porous material being in communication with a plenum containing the low viscosity liquid under a pressure substantially greater than the pressure on the resinous material being extruded.

It would be desirable if there were available an improved method and apparatus for the extrusion of synthetic resinous thermoplastic polymers.

It would also be desirable if there were available an improved apparatus for the extrusion of thermoplastic polymers.

It would also be desirable if there were a method for the extrusion of synthetic resinous polymers which permitted extrusion of the polymer while minimizing rough surfaces generally attributed to melt fracture.

It would also be desirable if there were available a relatively simple extrusion apparatus which would exhibit reduced tendency to cause melt fracture or surface roughness in the material extruded.

These benefits and other advantages in accordance with the present invention are achieved in a method for the extrusion of heat plastified synthetic resinous compositions including the steps of supplying a heat plastified synthetic resinous composition to a supply chamber, passing the heat plastified composition to a discharge conduit projecting into the supply chamber wherein the cross section of thermoplastic material in a direction normal to the direction of principal flow has an area equal to or greater than 16 times the area of the discharge conduit, the area of the discharge conduit being a section normal to the direction of principal flow of thermoplastic resin therein the supply chamber having a terminal end through which the discharge conduit passes, the discharge conduit having an entrance end and an exit end, the entrance end being positioned within the supply chamber at a location spaced from the supply chamber end and at a location wherein reduced melt fracture is obtained; the entrance end of the discharge conduit being spaced from the supply chamber end at a distance within the range of about one-half to about twice the average diameter of the supply chamber.

Also contemplated within the scope of the present invention is an extrusion apparatus for the extrusion of heat plastified synthetic resinous compositions into articles of a desired shape and a generally smooth surface, the apparatus comprising in operative combination a supply chamber adapted to receive heat plastified synthetic resinous material, the supply chamber having an entrance end and a discharge end, a discharge conduit, the discharge conduit having an entrance end and an exit end, the discharge conduit being generally coaxially disposed relative to the supply chamber, the discharge conduit being affixed to the discharge end of the supply chamber in a generally leakproof manner, the supply conduit having a major average diameter in a plane normal to a longitudinal axis thereof, the average diameter of the supply chamber being defined by an inner wall thereof, the discharge conduit having an average diameter in a plane normal to the longitudinal axis thereof defined by an external wall of the discharge conduit, the average diameter of the supply chamber being at least 4 times that of the average diameter of the discharge conduit, the discharge conduit having its first end extending into the supply chamber, a distance of from about one-half to about twice the average diameter of the supply chamber.

Figure 2:
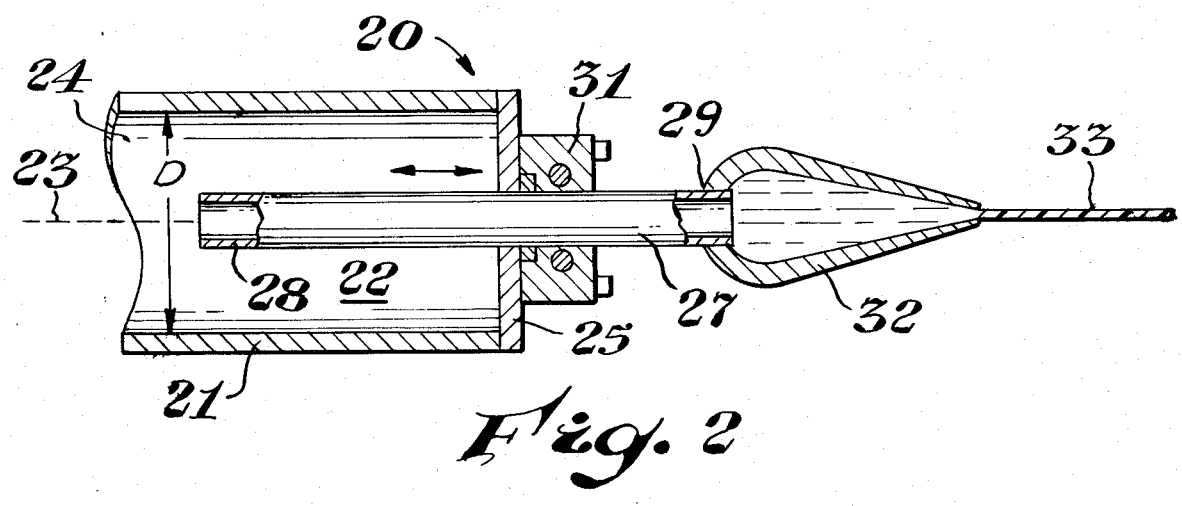
Figure 3:
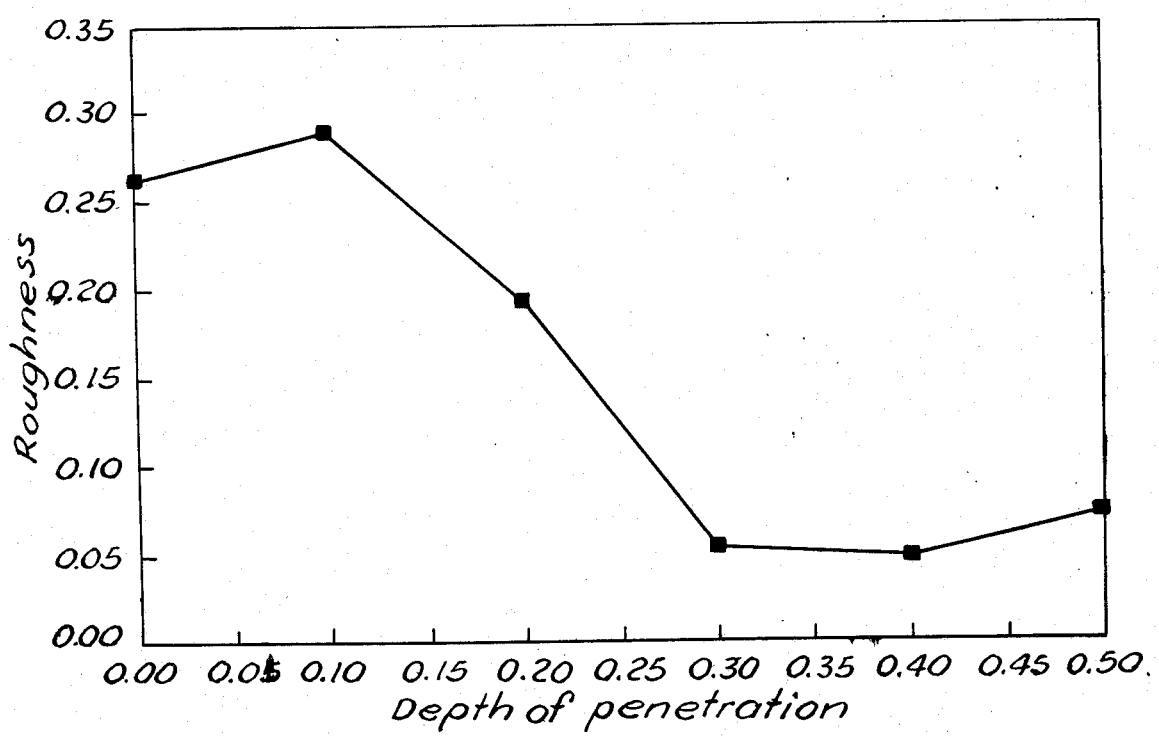

Further features and advantages of the present invention will become more apparent from the following experiments taken in connection with the drawing wherein FIG. 1 is a schematic representation of an extrusion apparatus in accordance with the present invention;

FIG. 2 is a simplified schematic sectional representation of an extrusion apparatus such as the apparatus of FIG. 1; and FIG. 3 is a graphical representation illustrating roughness of an extruded strand plotted against a discharge conduit position.

In FIG. 1 there is schematically depicted an extrusion apparatus generally designated by the reference numeral 10. The apparatus 10 comprises an extruder 11 having a drive 12, a barrel 13, the barrel 13 having a feed hopper 14 and a discharge end 15, the discharge end 15 defining therein a supply chamber not shown. Communicating with the discharge end 15 is a discharge conduit 16 which terminates in a sheet die 17 remote from the discharge end 15 of the extruder 11. A sheet of material 18 is discharged from the die 17. The die 17 can be axially positioned relative to the barrel 13 by moving the conduit 16 in directions indicated by the double-headed arrow.

In FIG. 2 there is schematically depicted a fractional sectional view of an extrusion apparatus 20 generally similar to the apparatus 10 of FIG. 1. The extrusion apparatus 20 as depicted in FIG. 2 comprises a generally cylindrical body 21 defining supply chamber 22. The supply chamber 22 has an axis of generation generally indicated by the reference numeral 23 and diameter "D". The body 21 defining the chamber 22 has an entrance end 24 and a generally closed discharge end 25. A discharge conduit 27 is also of generally cylindrical configuration and is disposed generally coaxially with the chamber 22. A discharge conduit 27 has a first or entrance end 28 and a second or discharge end 29. The entrance end 28 of the discharge conduit 27 is disposed coaxial with the chamber 22 and positioned between the entrance end 24 and closed end 25. The discharge end of the discharge conduit is disposed external to the chamber 22. A clamp member 31 is affixed to discharge end 25 of the body 21 and permits selective positioning of the entrance end 28 of the discharge conduit 27 in the direction indicated by the double-headed arrow, the clamp member 31 being rigidly affixed to end 25 and in a leak tight sealing engagement with the end and with discharge conduit 27. A die 32 affixed to a discharge end 29 of the discharge conduit 27 as depicted in FIG. 2 has a sheetlike member or extrudate 33 of synthetic resinous material being extruded from die 32.

As depicted in the drawing, the polymer supply chamber such as the supply chamber 22 of FIG. 2 and the discharge conduit 27 are most conveniently, from a mechanical standpoint, of a circular cross section. However, other geometrical configurations may be employed, such as square, hexagon, eliptical and the like. The main cross sectional relationship suitable for the practice of the present invention is when the cross sectional areas of the supply chamber and the cross sectional area of the passage in the discharge conduit are in a ratio of at least sixteen to one. Larger ratios may be employed, for example 100:1. Generally a ratio of about 25:1 is desirable. In practical operation, the discharge conduit may be employed as a die or as depicted in FIG. 2 the discharge conduit may feed a die such as a sheeting die, a pipe or tubing die, or a die of any shape useful for the preparation of synthetic resinous thermoplastic articles. Temperatures and pressures employed in the practice of the present invention are those that are conventionally utilized for the extrusion of the particular thermoplastic resinous composition being used. The usual and customary temperature control procedures are employed.

By way of further illustration, a plurality of extrusions were conducted utilizing an Instron Capillary Rheometer, model 3211. A material supply chamber was employed which had an internal diameter of 0.373 inches. The discharge conduit was of stainless steel having an outside diameter of 0.067 inches and an inside diameter of 0.032 inches. In the extrusion experiments, a high density polyethylene was used which was commercially available under the designation of HDPE 4052N. The material supply chamber was maintained at a temperature of 155 degrees centigrade and filled with resin particles. Small amounts of the particles were added to the chamber incrementally and packed to prevent the formation of air bubbles in the molten polymer. When an adequate quantity of polymer had been added, the ram of the rheometer was inserted into the chamber and a period of from about 7 to 10 minutes was allowed for temperature equalization. The ram was forced into the chamber at a rate of 20 centimeters per minute and the resultant extruded strand was discharged into the room temperature water bath. When the ram had displaced a desired amount of polymer from the supply chamber, extrusion was stopped. Subsequently, the strand was removed from the water, air dried, both ends of the strand removed, and surface roughness measured. The strand was mounted on a glass slide and the image projected onto a screen at a magnification of 50 times. The silhouette appearing on the screen was traced on tracing paper, the distance between the ends of the strand measured and designated as D1. The length of the undulating surface of the strand was determined employing an opisometer. Subsequently, such measurements were made using a VAX 11/780 computer with an interaction Tablet Tektronix 4953 and Tektronix Cat. 119.0622-00 used for data input. Excellent agreement was obtained between the opisometer readings and the computer readings. The depth of penetration of the discharge conduit was varied and at each depth setting surface roughness was determined by measuring the length of filament profile line on shadow graph divided by the distance between the ends of the fiber profile minus 1 to thereby provide a dimensionless number indicative of the roughness of the filament surface. The results were averaged for each depth of penetration and the results are graphically set forth in FIG. 3.

The numbers on the abscissa indicate the depth of penetration of the discharge conduit into the supply chamber, while the ordinate provides a value indicative of the roughness of the surface of the extruded strand.

In a manner similar to the foregoing, a wide variety of synthetic resinous materials may be extruded at relatively high rates to form articles having desirable smooth surfaces employing a wide variety of configurations of supply chamber and discharge conduit.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. A method for the extrusion of heat plastified synthetic resinous compositions into extrudates including the steps of supplying a heat plastified synthetic resinous composition to a supply chamber, passing the heat plastified composition to a discharge conduit projecting into the supply chamber wherein the cross section of thermoplastic material in a direction normal to the direction of principal flow has an area equal or greater than 16 times the area of the discharge conduit, the area of the discharge conduit being a section normal to the direction of principal flow of thermoplastic resin therein, the supply chamber having a terminal end through which the discharge conduit passes, the discharge conduit having an entrance end and an exit end, the entrance end being positioned within the supply chamber at a location spaced from the supply chamber end at a location wherein reduced melt fracture is obtained; the entrance end of the discharge conduit being selectively positioned so as to be spaced from the supply chamber end at a distance within the range of about one-half to about twice the average diameter of the supply chamber to minimize surface roughness of the extrudates for the particular resinous composition being extruded.

2. An extrusion apparatus for the extrusion of heat plastified synthetic resinous compositions into extrudates of a desired shape and generally smooth surface, the apparatus comprising in operative combination a supply chamber adapted to receive heat plastified synthetic resinous material, the supply chamber having an entrance end and a discharge end, a discharge conduit, the discharge conduit having an entrance end and an exit end, the discharge conduit being generally coaxially disposed relative to the supply chamber, the discharge conduit being affixed to the discharge end of the supply chamber in a generally leakproof manner, the supply conduit having a major average diameter in a plane normal to a longitudinal axis thereof, the average diameter of the supply chamber being defined by an inner wall thereof, the discharge conduit having an average diameter in a plane normal to the longitudinal axis thereof defined by an external wall of the discharge conduit, the average diameter of the supply chamber being at least 4 times that of the average diameter of the discharge conduit, the discharge conduit having its first end selectively positioned so as to be extending into the supply chamber, a distance of from about one-half to about twice the average diameter of the supply chamber to minimize surface roughness of the extrudates for the particular resinous material being extruded.

* * * * *